US005795035A

United States Patent [19]
Fuller

[11] Patent Number: 5,795,035
[45] Date of Patent: Aug. 18, 1998

[54] WHEEL COVER SIMULATING CAST ALUMINUM WHEEL

[75] Inventor: Everett Fuller, Orange, Calif.

[73] Assignee: Coyote Enterprises, Inc., Anaheim, Calif.

[21] Appl. No.: 896,681

[22] Filed: Jul. 18, 1997

Related U.S. Application Data

[63] Continuation of Ser. No. 532,075, Sep. 22, 1995, abandoned, which is a continuation-in-part of Ser. No. 239,567, May 19, 1994, Pat. No. 5,457,886.

[51] Int. Cl.$^6$ ............................................. B60B 7/00
[52] U.S. Cl. ............................. 301/37.32; 301/37.36; 301/37.1
[58] Field of Search ............................. 301/37.1, 37.31, 301/37.32, 37.34, 37.35, 37.36, 37.37, 37.39, 37.41

[56] References Cited

U.S. PATENT DOCUMENTS

| | | |
|---|---|---|
| 1,976,542 | 10/1934 | Clarke . |
| 2,110,808 | 3/1938 | Miller . |
| 2,127,600 | 8/1938 | Hunt . |
| 3,095,241 | 6/1963 | Fitzgerald . |
| 3,432,206 | 3/1969 | Spisak . |
| 3,496,753 | 2/1970 | Gibbings . |
| 3,726,566 | 4/1973 | Beith . |
| 3,757,400 | 9/1973 | Beisch . |
| 3,798,728 | 3/1974 | Beisch . |
| 3,881,778 | 5/1975 | Buerger . |
| 3,999,268 | 12/1976 | Jacobs .................... 301/37.39 X |
| 4,511,183 | 4/1985 | Spiegel et al. . |
| 4,606,582 | 8/1986 | Warren .................... 301/37.37 |
| 4,645,268 | 2/1987 | Carlson . |
| 4,787,681 | 11/1988 | Wang et al. . |
| 5,031,965 | 7/1991 | Buerger ................... 301/37.37 |
| 5,100,206 | 3/1992 | Feng . |
| 5,443,582 | 8/1995 | Ching ...................... 301/37.37 |
| 5,457,886 | 10/1995 | Fuller ..................... 301/37.1 X |
| 5,458,401 | 10/1995 | Baccman ................. 301/37.43 |

FOREIGN PATENT DOCUMENTS

| | | | |
|---|---|---|---|
| 3704384 | 8/1988 | Germany ............... 301/37.37 |
| 63-275401 | 11/1988 | Japan . |

*Primary Examiner*—Russell D. Stormer
*Attorney, Agent, or Firm*—Fulwider Patton Lee & Utecht, LLP

[57] ABSTRACT

A wheel cover which simulates a machined cast wheel is formed by stamping a blank from sheet metal. Windows spaced angularly about the cover defined by radially inwardly angled borders simulating depth are formed on the blank. A marginal circular periphery is formed into a peripheral flange. The front face of the wheel cover is machined on a numerically controlled lathe, such that the cutting tool closely follows the contour, to form fine spiral grooves simulating machine markings generally concentric about the center of the wheel, thereby exhibiting a machined finish. An attachment device is formed on the wheel cover to complete the assembly.

14 Claims, 5 Drawing Sheets

WHEEL COVER SIMULATING CAST ALUMINUM WHEEL

BACKGROUND OF THE INVENTION

This application is a continuation of U.S. Ser. No. 08/532,075, filed Sep. 22, 1995, now abandoned which was a continuation-in-part application of U.S. Ser. No. 08/239,567, filed May 9, 1994, titled METHOD OF MAKING A WHEEL COVER SIMULATING ALUMINUM WHEEL SCULPTURE, now U.S. Pat. No. 5,457,886.

FIELD OF THE INVENTION

The present invention relates to an aluminum wheel cover to mount on a steel wheel to simulate a machined cast aluminum wheel.

DESCRIPTION OF THE PRIOR ART

Efforts have been made in the past to improve the appearance of original equipment automotive steel wheels. Such attempts have included colorizing or coating the wheel, physically augmenting the wheel, affixing a hub cap or wheel cover on the wheel, adding trim to the wheel, and replacing the wheel itself.

Conventional OEM steel wheels can be painted or plated to enhance their appearance. These methods require considerable effort and have a limited result in enhancing the overall appearance of such wheels.

Other efforts to improve the appearance of a conventional wheel have led to the attachment of an exterior plate or a series of plates by mounting them from the lugs. Such plates are intended to increase the width of the wheel making it appear more massive. U.S. Pat. No. 4,787,681 describes such an apparatus.

Further efforts to camouflage the appearance of a rudimentary automobile wheel have led to the incorporation of a cap or cover. Such caps can be plastic, metal, or wire spoked. The plastic caps are typically formed by injection molding. The metal caps are formed by casting or a blanking and drawing operation. U.S. Pat. Nos. 1,976,542, 3,095,241, and 3,496,753 show examples of wheel caps and covers and the method of making them. Such caps or covers often suffer the shortcoming that they present little more than surface decoration providing little in the way of optical illusion persuasive of a faithful reproduction of a cast wheel.

It has also been proposed to add wheel trim to a rudimentary wheel or to a hub cap mounted on a wheel. The wheel trim is often employed in an effort to make the hub cap or wheel appear wider and can be configured to obscure from view the junction between the tire and the wheel. U.S. Pat. No. 3,798,728 suggests such an approach.

Often consumers are driven to replace the entire wheel in a quest for stylish transport. Previous solutions in the nature of augmenting the wheel sometimes presented a flimsy and visually unappealing wheel design. Thus, various forms of decorative automobile wheels themselves have been proposed. Aftermarket automobile wheels are typically cast aluminum or stamped and rolled steel wheels. For the cast aluminum wheel, the surface to be exposed to view is machined with a lathe cutting tool to remove rough edges and provide a smooth texture and luster. The lathing process leaves spiral markings indicative of the process. A machined cast wheel has a unique appearance that is valued by consumers. Consumers desire a machined appearance.

Decorative machined wheels, however, are expensive to manufacture and finish. The cost of making even the least expensive decorative machined cast wheel can be four times that for steel wheels augmented by other methods appearance augmentation, such as wheel covers. Decorative automobile wheels are also bulky, heavy, and cumbersome to package and transport to retail outlets.

Thus, consumers are faced with the choice of an expensive machined cast wheel or less expensive, though less attractive, devices. These less expensive devices do not have the improved appearance resulting from the machining process. They lack the high quality appearance that consumers normally associate with a high-end machined cast aluminum wheel.

Efforts have been made to place decoration on wheels in an assembly line so that, at the final stages of the manufacturing process, the surface appearance of a wheel structure can be changed. One such process allows the workman to draw a thin web of applique from a roll and peel a cover from the back thereof to expose an adhesive surface for application to the face of the wheel. It has been suggested that the applique be constructed of stainless steel having a thickness on the order of 0.5 mm or an aluminum alloy of a thickness of about 0.8 mm. A device of this type is shown in U.S. Pat. No. 5,458,401 to Baccman. While satisfactory for the intended purpose of changing the surface appearance of wheels so constructed, such an approach is ineffective to alter the metal on the face of the wheel to cooperate with various recesses to exhibit a convincing appearance incorporating machine cut grooves to faithfully imitate a cast wheel. In fact, machine cut grooves are typically 0.8 mm deep or deeper, thus rendering it impractical to apply machine cut grooves to such appliques.

Ordinary wheel covers have not achieved a resemblance to quality machined wheels that would give a consumer an inexpensive alternative to expensive cast machined wheels.

SUMMARY OF THE INVENTION

The present invention provides an inexpensive wheel cover which simulates a machined cast wheel or a steel wheel. A machined wheel is simulated by incising a round blank from a stock of sheet metal. After an initial forming process, sections of the blank are removed across the surface of the blank at spaced intervals to form windows positioned in a pattern and configured to, when the edges thereof are formed to bend radially inwardly, present an appearance simulating that of a spoked wheel. The blank is formed to create indentations around each window giving the appearance of depth. A margin on the periphery of the blank is turned back to form a peripheral retaining flange. An attachment device is provided for securely attaching the wheel cover to a tire wheel. The blank is painted to simulate contour and depth. A lathe cutting tool is used to machine the outer side of the blank and the outer surface of the peripheral flange forming spiral grooved markings thereon to simulate the appearance of a machined cast aluminum wheel. The cutting tool closely follows the contours of the blank making a single pass across its surface. This precision is achieved by a numerically controlled (CNC) lathe system. The resultant wheel cover assembly is clear coated with a sealant and a logo may be attached at the center. The cover then provides a three dimensional appearance which, even at a relatively modest cost of manufacture, effects an appearance closely simulating that of an expensive cast wheel.

The method for making this wheel includes forming a disk from a blank, making indentations to simulate openings, forming a predetermined pattern on the outer surface and then affixing an attachment device.

3

Other features and advantages of the invention will become apparent from the following detailed description, taken in conjunction with the accompanying drawings which illustrate, by way of example, the features of the invention.

DESCRIPTION OF THE PREFERRED EMBODIMENTS

As shown in the drawings for purposes of illustration, the present invention comprises a wheel cover simulating a machined wheel. An inexpensive wheel cover can be made to have the same appearance as an expensive, high quality machined cast wheel. The wheel cover is formed from a circular blank of sheet metal. The wheel cover surface is stamped to create a circular pattern of indentations and apertures configured to cooperate in presenting formed radial members simulating the spoke configuration of a machined cast aluminum wheel. The wheel cover is coupled to an annular retaining ring creating a wheel cover assembly that can be attached to an automobile steel wheel. The wheel cover is machined to resemble the appearance of a cast aluminum wheel, coated with a sealant, and decorated with a central logo.

Figures 1, 2, 3, 4:
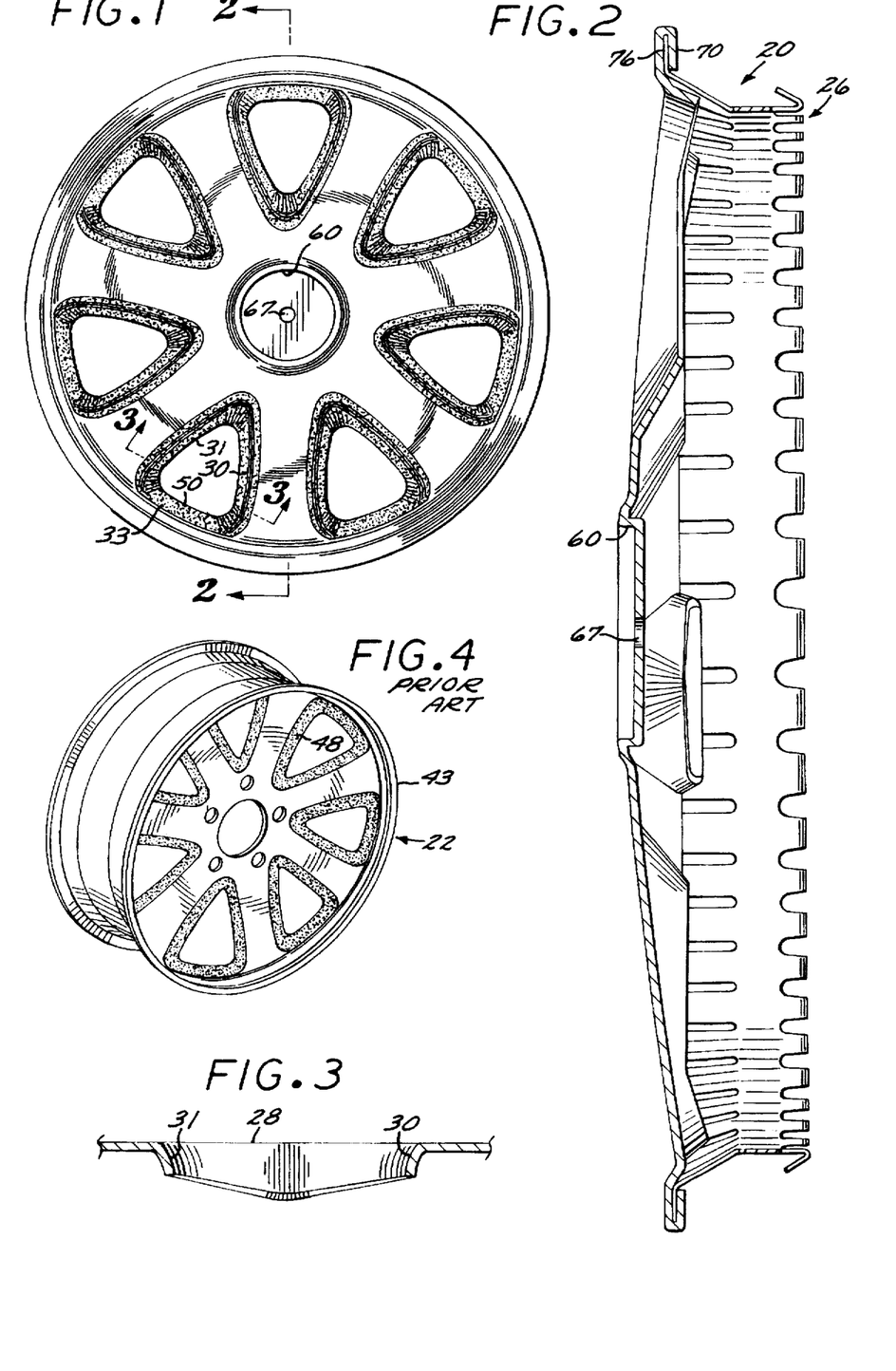
FIG. 1 is a front view of a wheel cover assembly of the present invention and simulating a machined wheel.
FIG. 2 is a cross-sectional view, in enlarged scale, taken along the line 2—2 of FIG. 1.
FIG. 3 is a cross-sectional view, in enlarged scale, taken along the line 3—3 of FIG. 1.
FIG. 4 is a perspective view of a cast machined wheel to be simulated by the cover assembly shown in FIG. 1.

Referring to FIG. 4, cast machined wheels 22 have become popular with automobile customers. Such wheels are typically an after market product which may embody various custom designs. Such wheels may be made or fabricated from cast aluminum or the like. The wheels may include a tire rim 43 secured to a central rim portion which is formed by a series of radial spokes 46 which form

4 therebetween spoked apertures 48. Typically such spoke apertures diverge radially outwardly from a radially interior apex. The manufacturing method typically involves fabrication of a casting mold in which aluminum is casted to provide a wheel section which may be two or three inches or more thick. The finishing process typically involves a machining of the cast surfaces by a milling machine or the like which is operative to repeatedly pass a cutting bit over the wheel surface to perform the final contour and finished surface. The finished surface thus typically presents a series of concentric or fine spiral machine grooves which have become recognized by customers as a characteristic of machined cast wheels. Because of the quantity of metal required for the casting process and the labor intensive process of casting and machining the wheel, the cost of production is substantial thus leading to a relatively high sales price. The relative high cost of such cast wheels is such that they are beyond the reach of a great segment of the purchasing public. It is thus an object of the present invention to provide a relatively inexpensive wheel cover which can be snap fit onto conventional wheels to simulate the appearance of a relatively expensive custom machined wheel.

Figure 5:
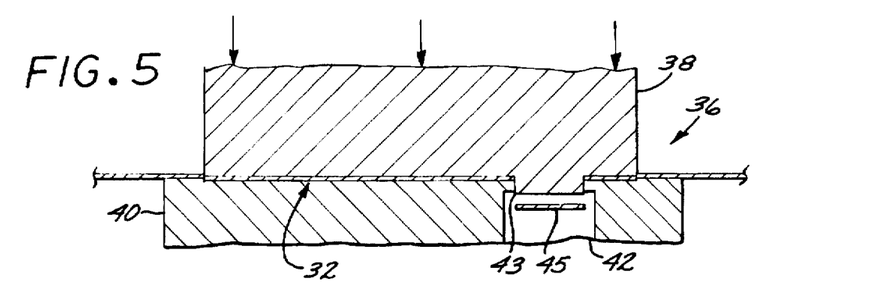
FIG. 5 is a cross-sectional view of a die set blanking a sheet of metal in a process for making the wheel cover assembly shown in FIG. 1.
Figure 6:
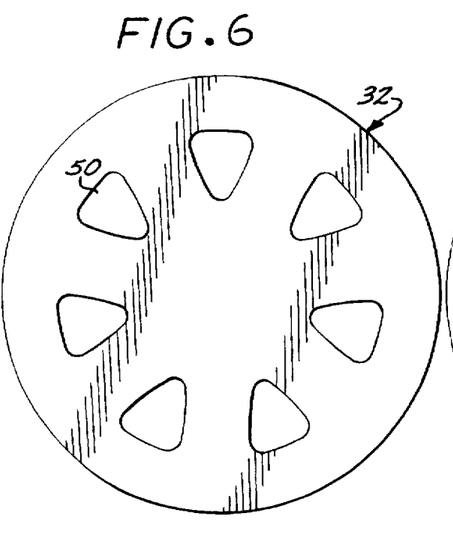
FIG. 6 is a plan view of the blank formed by the step shown in FIG. 5.

Referring to FIG. 5, the wheel cover 20 of the present invention is formed by cutting a two sided round blank 32 from a stock sheet of aluminum alloy using a standard die set 36. The aluminum alloy stock is preferably 2 mm thick alloyed aluminum disks. The standard set may include a punch 38 and a press 40, formed with round cavity 42. The punch 38 is formed with a circular array of triangularly shaped punch elements 43 for punching respective triangular blanks 45 from the circular blank 32 to, with the blanking process, form relatively small window openings 50 (FIG. 6).

Figure 7:
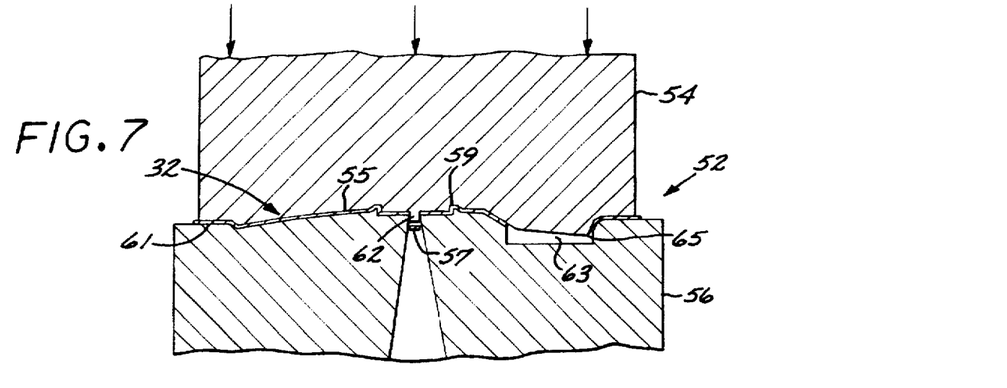
FIG. 7 shows a die set performing a drawing operation on the blank shown in FIG. 6.

Referring to FIG. 7, the blank 32 with the window openings 50 formed therethrough is subjected to multiple shaping steps, as for instance a two step drawing operation. The blank 32 is stamped in a die set 52 corresponding to the configuration, shape, and appearance of the machined wheel 22 (FIG. 2) to be simulated. A second stage punch 54 and press 56 alter the dimensions of the blank 32 to press the metal further toward the desired shape. The drawing operation is accomplished in two steps having progressively deeper draws to gradually work the blank into the desired shape.

Press 56 is formed with a formed cavity 55 configured with a central bore 57 for receipt of a complementary punch pin 62 in the punch 54. The cavity 55 itself is generally circular with a raised central area defining a dome shape and having centrally raised ring 59 and tapering downwardly and outwardly to a peripheral ridge 61. Formed in a circular array about the cavity 55 is a plurality of triangular cavities 63 for complemental receipt of respective triangular punch elements 65.

Figure 8:
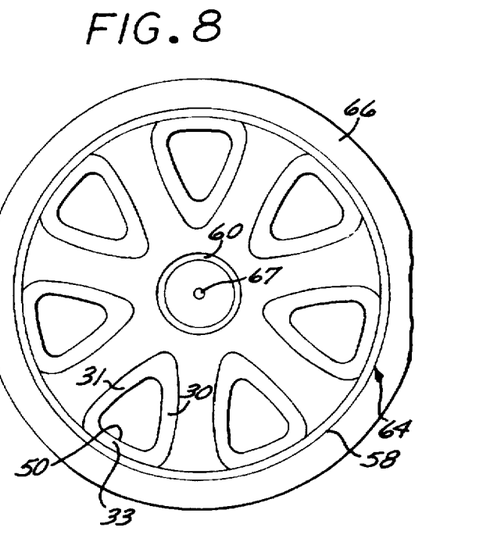
FIG. 8 is a front view of a blank formed by drawing operation steps shown in FIG. 7.

Thus, when the punch 54 strikes the press 56 with the blank 32 in position, the central punch pin 62 will be operative to punch a central hole 67 in the blank (FIG. 8) and the ring 59 will concurrently cooperate with the punch 54 to form a central ring 60 to define a circular central recess in the blank. The body of the blank will then curve in a direction generally radially outwardly and axially inwardly in a dome shape and to the outer ribs 64 where the annular curve 58 will be formed to define radially exteriorly thereof an annular flange 66. The punch element 65 will be further operative during this striking process to bend the borders about the periphery of the windows 50 downwardly as viewed in FIG. 7 to provide a downwardly and inward angle thereto, thus providing an initial forming which will eventually produce angular side borders 30 and 31 for each of the windows 50 which diverge radially outwardly to respective annular rim borders 33. It will be appreciated that this striking process and forming may be repeated in a progressive manner to the degree and extent required for the particular alloy thickness of metal heat treat and depth desired for the entire border of respective windows openings 50. This then serves to form the final windows 50' of the desired shape and size. The blank may then be struck again to establish a final trim for the finished shape of the window openings and to trim the periphery to the desired end size and circular configuration.

Figure 9:
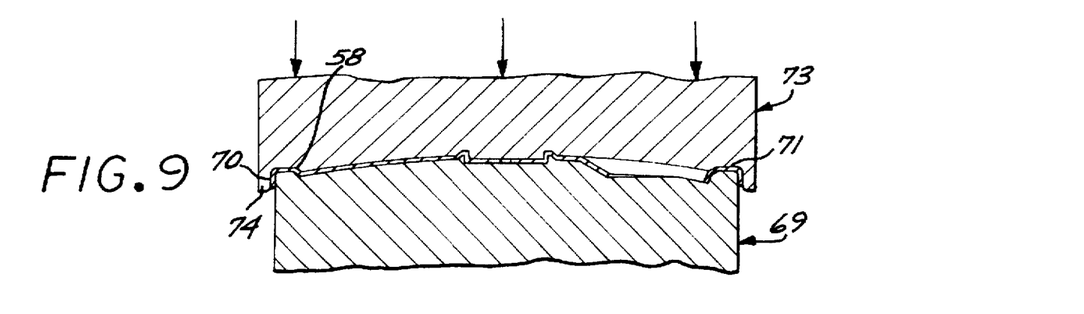
FIGS. 9–14 are sectional views of the blank shown in FIG. 8 as it progresses through various forming steps.

The next step is to crimp the marginal flange area of the blank onto a conventional retainer ring generally designated 26. For illustrative purposes, one procedure is shown in FIG. 9 and involves a press generally designated 69 having a cavity on which the blank may be positioned and formed with an upwardly raised radial ridge 71. The punch generally designated 73 is complementally formed and defines a female downwardly extending overhanging bead 74. Thus, the blank may be positioned in the press cavity with the curve 58 registered on the interior edge of the ridge 71 and, when struck with the punch, the flange 66 (FIG. 8) will be bent to form a cylindrically shaped retainer flange 70 oriented to, when the blank is viewed as the cover would be positioned on an automobile rim, project axially inwardly.

Figure 10:
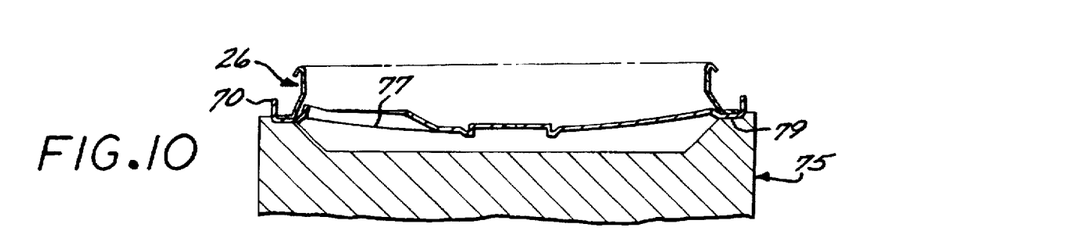
Figure 11:
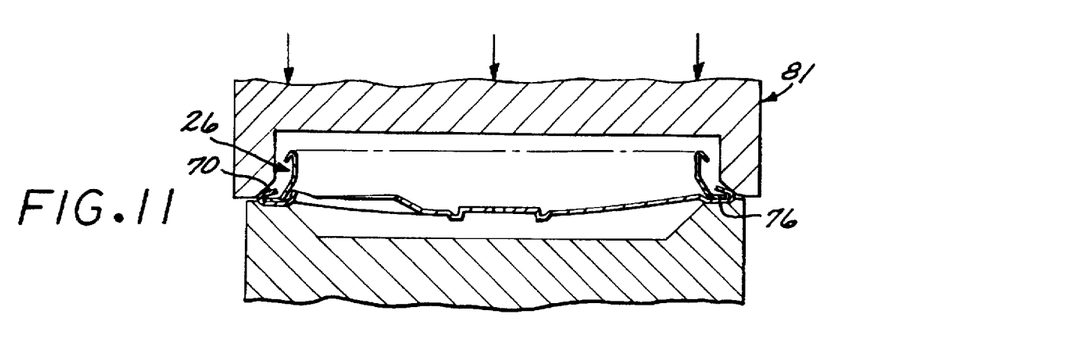

Referring to FIG. 10, a press generally designated 75 is provided with a cavity 77 configured at its radial extremities with an annular groove 79 for nesting thereonto of the radially outer extent of the partially formed blank. Thus, the blank may be inverted from the position shown in FIG. 9 and the retainer ring nested thereon within the confines of the retainer flange 70.

Figure 12:
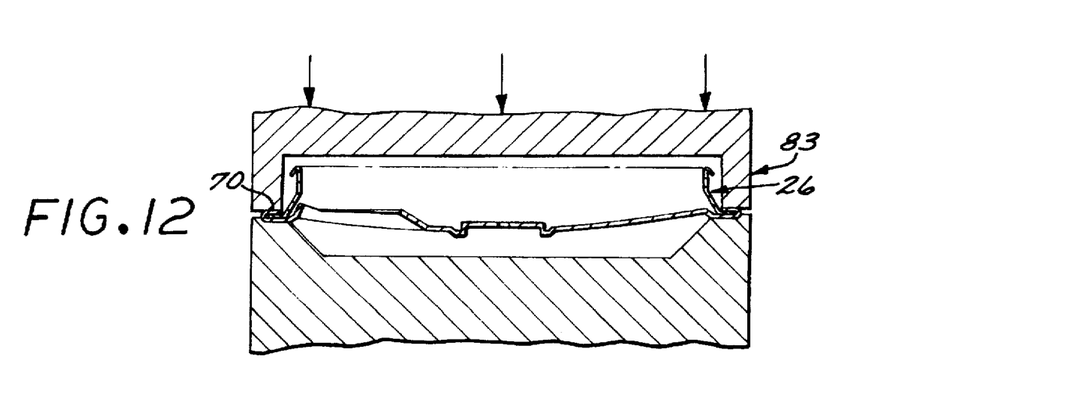

A cooperating punch, generally designated 81 is made to strike radial flange 70 and fold it radially inwardly over the retained flange 76 of the retainer ring 26. If necessary, the retainer flange 70 may be struck again with a second punch, generally designated 83, as shown in FIG. 12.

Figure 13:
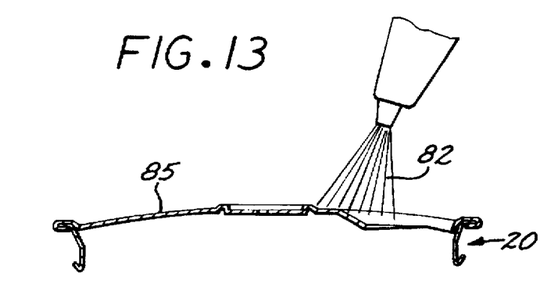

Thereafter, paint, sandblast, or other forms of applied coloration, 82 is sprayed or otherwise applied on the outer side 85 of the wheel cover assembly 20, as shown in FIG. 13, to add to its decorative appeal and to, when further processed provide shading to give an impression of depth.

Figure 14:
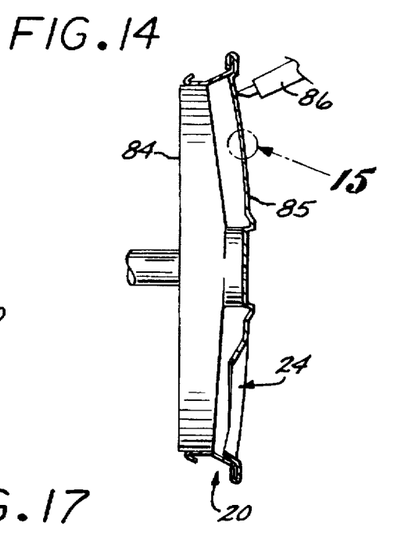
Figure 15:
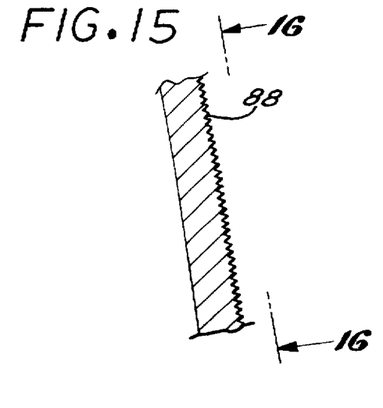
FIG. 15 is a detailed view, in enlarged scale, taken from the circle shown in FIG. 14.
Figure 16:
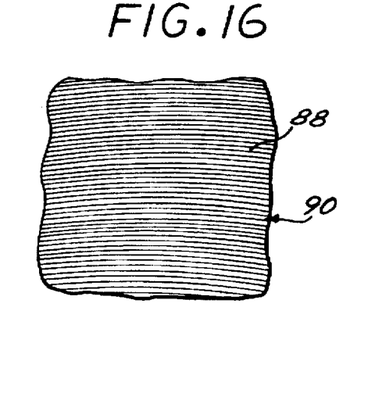
FIG. 16 is a partial front view taken along the line 16—16 in FIG. 15.
Figure 17:
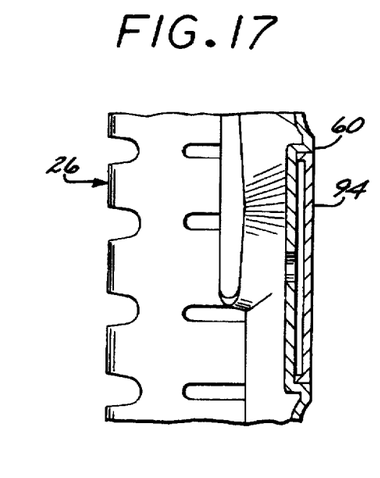
FIG. 17 is a partial cross-sectional side view, in enlarged scale, similar to FIG. 16.

Referring to FIG. 14, the wheel cover assembly 20 is then mounted on a machine tool 84. A computer numerically controlled ("CNC") lathe cutting tool 86 is then utilized to cut tiny spiral machine grooves 88, shown in FIG. 15, on the outer surface 85 of the wheel cover 24. Because the cover has already been formed to its desired shape, this machine etching may be accomplished in one pass of the lathe cutting tool 86. The CNC is programmed to operate the cutting tool so the detentes 28 (FIG. 4) and borders 30, 31, 33 (FIG. 8) around the windows 50 are preferably left unmachined, thus leaving the paint or other finish in place. This then leaves the borders 30, 31, 33 darker than other portions of the outer side surface 85 to cooperate in presenting the appearance of depth. The fine machine grooves 88 (FIG. 15) etched on the wheel cover cooperate with the inwardly opening borders 30, 31, 33 (FIG. 8) to simulate the appearance of the spokes 46 and openings 48 of the selected machined wrought wheel 22 (FIG. 4). After the machining operation, the wheel cover exhibits a texture 90 of spirals of fine machine groove lines, as shown in FIG. 16. These machine groove lines give the wheel cover assembly the appearance of the machine lines on a decorative wrought wheel.

Debris and metal shavings are removed from the surface of the wheel cover. The wheel cover assembly 20 is coated with a clear sealant. A logo plate 94 is mounted to the wheel cover assembly using a pressure sensitive adhesive.

In operation, the wheel cover assembly is mounted on an automobile by thrusting it into the exterior of an automotive steel wheel to thus stimulate a relatively expensive machined aluminum cast wheel. In addition to improving the appearance of the automobile, the improved wheel cover has beneficial functional attributes to the wheel.

It will be appreciated that the wheel cover assembly of the present invention may thus be conveniently installed on a conventional automobile wheel by merely snapping it into position. Even the most modest wheel will then exhibit the appearance of a relatively expensive cast machined wheel. Moreover, when the automobile is underway, the windows 50, in combination with the radially inwardly and converging lips defining the borders 30, 31, and 33 will serve to circulate air in heat exchange relationship with the rim to thereby facilitate dissipation of heat generated by, for instance, actuation of the automobile brakes. To this end, when the wheel cover 20 of FIG. 1 is rotated in, for instance, a clockwise direction, the leading lip 31 will tend to draw ambient air radially inwardly within the wheel cover (FIG. 4) and the trailing lip 30 will tend to exhaust hot air from the space between the cover and the rim to thereby enhance circulation of air. This feature compounds the cooling effect by the fact that air currents circulate from one window to the next and introduce a graphic flow of air thereby enhancing heat dissipation.

Figures 18, 19, 20:
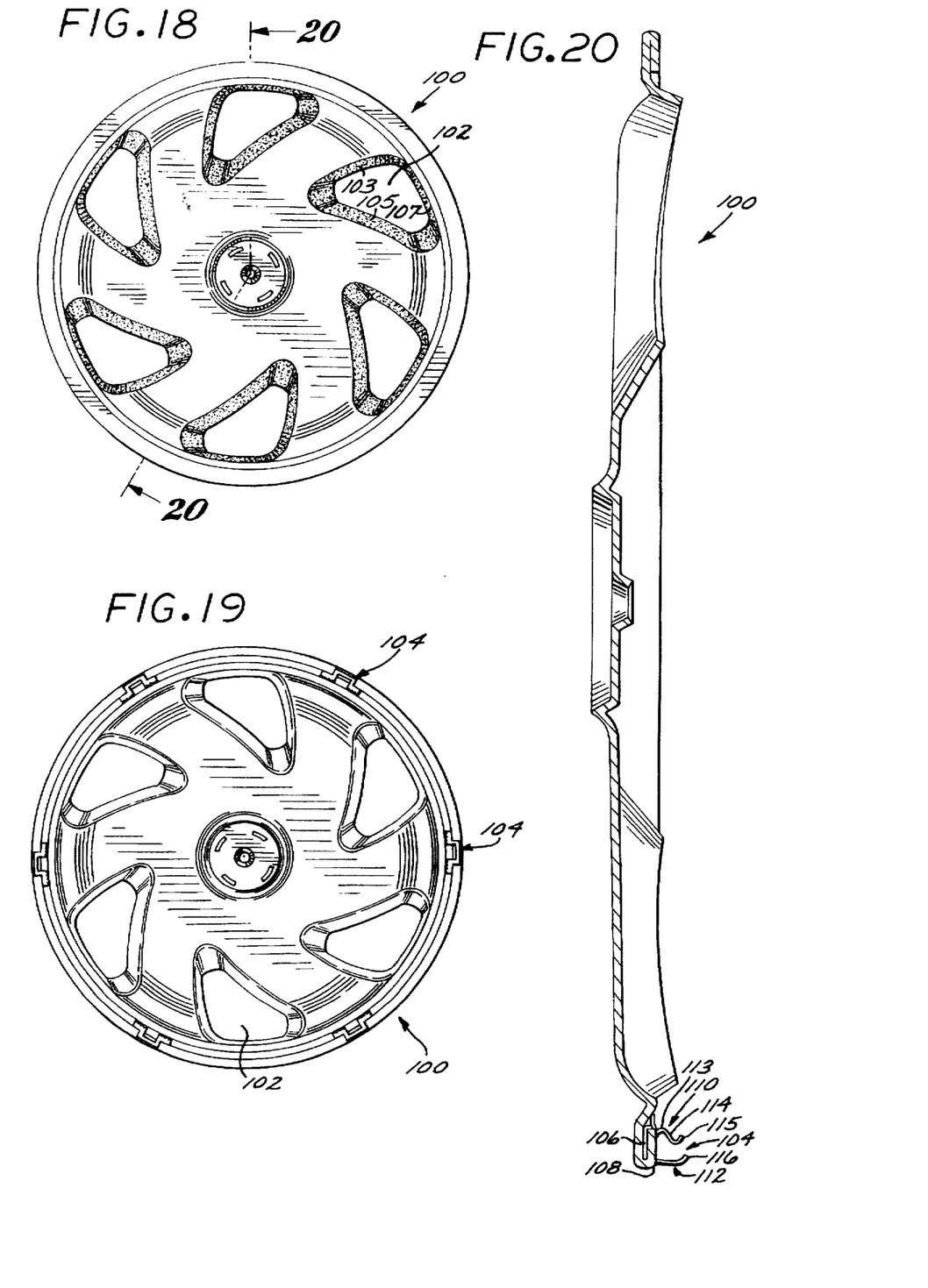
FIG. 18 is a front view of a second embodiment of the wheel cover assembly of the present invention and simulating a machined wheel.
FIG. 19 is a back view of the wheel cover assembly shown in FIG. 18.
FIG. 20 is a cross-sectional view, in enlarged scale, taken along the line 20—20 of FIG. 19.

Referring to FIGS. 18–20, there is shown a second embodiment of the wheel cover assembly of the present invention. As is shown in FIG. 18, the windows 102 in the second embodiment are in the form of generally triangular apertures encircled by respective radially inwardly projecting and converging lips defining borders 103, 105 and 107. The apertures are spaced about the periphery of the wheel cover 100 with respective first sides projecting generally parallel to the adjacent segment of the outer edge of the wheel cover to create a different overall appearance of the wheel cover compared to that shown in FIGS. 1–17. Thus it will be appreciated that a plurality of differently configured wheel covers may be manufactured to simulate the many popular styles of machined cast aluminum wheels and that the two designs disclosed herein are meant for illustrative purposes.

Referring to FIGS. 19 and 20, in place of the retainer ring 26 utilized in the first embodiment and shown in FIG. 2, a plurality of attachment clips, generally designated 104, are disposed in a circular array about the periphery of the inner surface of the wheel cover assembly 100. The attachment clips include respective bases 106 which are captured under the radially inwardly turned retainer flange 108 to securely attach the clips to the wheel cover assembly. Such capturing of the respective bases may be accomplished by performing steps similar to those shown in FIGS. 10–12.

The attachment clips further include respective fastener forks formed by pairs of opposing, deflectable prongs, generally designated 110 and 112 (FIG. 20). The individual prongs 110 are generally S-shaped to curve radially inwardly and turn axially inwardly to form a spring segment 113 to then angle radially outwardly and axially inwardly at 114 and then turn back on itself to form an out-turned retainer 115. The prong 112 projects axially inwardly in radially spaced relation to the retainer to turn radially inwardly and form a curved hook 116 spaced opposite the retainer 115. The separation between the prongs at their respective distal ends is less than the standard width of a tire rim bead. As such the prongs will be deflected away from each other as the respective clips 104 engage the bead of the tire rim. When the wheel cover has been thrust onto the tire rim to such a degree that the bead of the rim rests against the axially inner side of the retainer flange 108, the respective prongs serve to securely attach the wheel cover to the tire rim. The hook 116 holds the radially outwardly projecting edge of the tire rim bead against the wheel cover, while the radially outwardly, axially inwardly projecting segment 114 is biased to snugly rest against the axially inwardly projecting surface of the tire rim to aid in securely, yet releasably, attaching the wheel cover to the tire rim.

It will be appreciated by those skilled in the art that many different types of fasteners could be utilized to securely attach the wheel cover of the present invention to a conventional tire rim. Such fasteners may take the form of variously configured clips, different types of deflectable, curved prongs defining hooks and the like which may be disposed in a circular array about the periphery of the inner side of the wheel cover to engage the tire rim bead and thereby securely attach the wheel cover to the tire rim. In addition, the wheel cover of the present invention may include gripping devices which removably attaches to the conventional lug nuts to securely attach the wheel cover to the tire rim.

From the foregoing, it will be appreciated that the wheel cover of the present invention utilizes a relatively modest amount of metal and is not labor intensive. The forming process can be efficiently achieved on a production line basis and the machining process involves only a single pass of the cutting tool. All these features cooperate together in providing a relatively inexpensive wheel cover which persuasively simulates a more expensive machined wheel casting.

While several forms of the invention have been illustrated and described, it will be apparent that various modifications can be made without departing from the spirit and scope of the invention.

What is claimed is:

1. A machined aluminum wheel cover assembly for attachment to a tire wheel to simulate a selected spoke pattern of a machined cast aluminum wheel and comprising:
    a self supporting contoured wheel cover for covering said wheel, said cover being constructed of an aluminum alloy sheet stock for disposition in covering relationship projecting radially outwardly from the center thereof to a peripheral edge and having axially inner and outer sides;
    a plurality of indentations formed in said wheel cover arranged in a pattern corresponding with openings between said spokes on said machined cast aluminum wheel and formed by respective axially inwardly projecting lips extending from respective apexes arranged in a circular pattern and diverging radially outwardly to respective radially outside peripheral lip sectors to thereby cooperate in simulating the configuration of the openings between said spokes;
    a mechanical attachment device on said wheel cover for attaching said wheel cover to said tire wheel to support said cover from said wheel to be disposed in covering relationship; and
    a spiral groove pattern on said outer side of said cover to thereby cooperate with said plurality of indentations to simulate the appearance of said machined cast aluminum wheel whereby said wheel cover may be attached to said wheel by said mechanical attachment device to be held by said device in covering relationship over said wheel.

2. A wheel cover assembly as recited in claim 1 further comprising:
    coloration applied to selected areas on said wheel cover to simulate depth and contour.

3. A wheel cover assembly as recited in claim 1 wherein:
    said attachment device comprises an attachment ring having a peripheral retention bead and further including:
    a retainer flange extending radially inwardly from the periphery of said wheel cover configured to surround said retention bead retaining said attachment ring coupled to said wheel cover.

4. A wheel cover assembly as recited in claim 1 comprising:
    angled borders around each respective said plurality of indentations to simulate depth.

5. A wheel cover assembly as recited in claim 1 wherein:
    said wheel cover is dome shaped to form an outwardly convex central dome.

6. A wheel cover assembly as recited in claim 1 wherein:
    said aluminum alloy is substantially 2 mm. thick.

7. A wheel cover assembly as recited in claim 1 wherein:
    said attachment device comprises a plurality of attachment clips including respective bases and further including:
    a retainer flange extending radially inwardly from the periphery of said wheel cover configured to engage the respective said bases to retain said attachment clips coupled to said inner side of said wheel cover.

8. A wheel cover assembly as set forth in claim 1 for mounting on a wheel including lug bores and wherein:
    said cover includes a central area configured to be, when said cover is mounted on said wheel, disposed in covering relationship over said lug bores.

9. A machined aluminum wheel cover assembly to cover a tire wheel and simulate a selected pattern of openings in a machined cast aluminum wheel comprising:
    a self supporting contoured wheel cover constructed of an aluminum alloy sheet stock of no less than about 2 mm thick for disposition in covering relationship over the axially outer face of said vehicle wheel and having axially inner and outer sides;
    a plurality of indentations formed in said wheel cover arranged in a pattern corresponding with said openings on said machined wheel and formed by respective axially inwardly projecting lips bordering the respective indentation, arranged in a circular pattern to thereby cooperating in simulating the configuration of the openings in said machined cast aluminum wheel;
    a mechanical attachment device on said wheel cover for attaching said wheel cover to said tire wheel to support said cover in covering relationship thereover; and
    a spiral groove pattern on said outer side of said cover to simulate a lathe cut and cooperating with said plurality of indentations to simulate the appearance of said machined cast aluminum wheel.

10. A wheel cover assembly as set forth in claim 9 wherein:
    said mechanical attachment device includes axially inwardly projecting flexible prongs.

11. A wheel cover assembly as set forth in claim 10 wherein:
    said prongs are curved.

12. A wheel cover assembly as set forth in claim 9 wherein:

said spiral groove pattern includes grooves cut by a lathe tool.

13. A wheel cover assembly as set forth in claim 9 wherein:

said mechanical attachment device is constructed to frictionally engage and grip a portion of said wheel.

14. A machined aluminum wheel cover assembly for covering a tire wheel to simulate a machined cast aluminum wheel and comprising:

a thin drawn wheel cover constructed of an aluminum alloy and having axially inner and outer sides;

a plurality of indentations formed in said wheel cover arranged in a pattern to simulate vent openings separated by spokes and formed by respective axially inwardly projecting lips extending from respective apexes arranged in a circular pattern and diverging radially outwardly to respective radially outside peripheral lip sectors;

a mechanical attachment device on said wheel cover for attaching said wheel cover to said tire wheel;

a circular pattern of fine grooves on said outer side of said cover to simulate the lathe cut of a machined cast wheel and cooperating with said plurality of indentations to simulate the appearance of said machined cast aluminum wheel and said wheel cover being formed with a sufficient thickness to exhibit sufficient rigidity to be carried from said tire wheel solely by said mechanical attachment device.

* * * * *